(12) United States Patent
Han et al.

(10) Patent No.: US 7,581,028 B2
(45) Date of Patent: Aug. 25, 2009

(54) METHOD FOR EFFICIENT IMAGE DISTRIBUTION AND MANAGEMENT

(75) Inventors: Keesook J. Han, Utica, NY (US); Bruce W. Suter, Whitesboro, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1109 days.

(21) Appl. No.: 11/041,076

(22) Filed: Jan. 19, 2005

(65) Prior Publication Data

US 2005/0193083 A1 Sep. 1, 2005

Related U.S. Application Data

(60) Provisional application No. 60/538,482, filed on Jan. 22, 2004.

(51) Int. Cl.
*G06F 15/16* (2006.01)
(52) U.S. Cl. .................... 709/247; 709/219
(58) Field of Classification Search ............... 709/247, 709/219
See application file for complete search history.

(56) References Cited

U.S. PATENT DOCUMENTS

| | | | |
|---|---|---|---|
| 6,999,988 B2 * | 2/2006 | Buddhikot et al. | 709/203 |
| 7,389,305 B1 * | 6/2008 | Kindig et al. | 707/103 R |
| 2002/0007392 A1 * | 1/2002 | Buddhikot et al. | 709/203 |

* cited by examiner

*Primary Examiner*—Vivek Srivastava
*Assistant Examiner*—Thomas Duong
(74) *Attorney, Agent, or Firm*—Joseph A. Mancini

(57) ABSTRACT

Method for efficient image distribution and management Invention employs compact image data structures and packet delivery techniques for Internet applications. Images on a Web page are inefficiently stored, using a single image per file. Invention uses clustering to merge similar images into a single file in order to exploit the redundancy between images. A 30-50% image data size reduction is achieved by eliminating the redundancies of color indexes. A metadata file permits an easy extraction of images. Present invention permits a more efficient use of the cache, since a shorter list of cache references is required. Packet and transmission delays are reduced by 50% eliminating redundant TCP/IP headers and connection time. Present invention eliminates redundancy and provides valuable benefits for optimizing packet delivery in IP networks by reducing latency and minimizing the bandwidth requirements.

10 Claims, 10 Drawing Sheets

C3: JPEG

| Clustered Images | File Format | Image Numbers | Original bytes | Compact bytes | Reduction % | PSNR dB |
|---|---|---|---|---|---|---|
| Menu | GIF | 7 | 13,919 | 8,028 | 42.32 | 39.5 |
| Submenu | GIF | 8 | 10,877 | 6,576 | 39.54 | 37.7 |
| Software | JPEG | 15 | 56,753 | 30,297 | 46.62 | 25.8 |
| Accessories | JPEG | 14 | 43,706 | 21,489 | 50.83 | 25.3 |
| Movies | JPEG | 20 | 210,145 | 120,025 | 42.88 | 33.0 |
| Products 1 | JPEG | 56 | 162,095 | 70,706 | 56.34 | 28.5 |
| Products 2 | JPEG | 110 | 349,624 | 155,466 | 55.54 | 28.2 |

FIGURE 4

| File Types | Transferred Files | Transferred bytes | Packets MTU=576 | Packets MTU=1500 | Delay(ms) MTU=576 | Delay(ms) MTU=1500 |
|---|---|---|---|---|---|---|
| Original | 61 | 102,458 | 217 | 106 | 498 | 824 |
| Compact | 6 | 71,830 | 137 | 53 | 314 | 412 |
| Reduction | 90% | 30% | 37% | 50% | 37% | 50% |

FIGURE 10

METHOD FOR EFFICIENT IMAGE DISTRIBUTION AND MANAGEMENT

PRIORITY CLAIM UNDER 35 U.S.C. §119(e)

This patent application claims the priority benefit of the filing date of a provisional application, Ser. No. 60/538,482, filed in the United States Patent and Trademark Office on Jan. 22, 2004.

STATEMENT OF GOVERNMENT INTEREST

The invention described herein may be manufactured and used by or for the Government of the United States for governmental purposes without the payment of any royalty thereon.

BACKGROUND OF THE INVENTION

The growth of the World Wide Web has contributed significantly to the network traffic on the Internet. Congestion can occur at network exchange points or across links due to the increase of bandwidth usage, user-perceived latencies, and Web server loads [1][9]. Web caching has become an important topic for reducing latency and overall bandwidth consumption [4]. Various caching mechanisms have been proposed as solutions for improving the retrieval rate of large distributed documents [2][10][14].

Location of Web caching servers, network topology, and traffic flow are important factors to build the effective Web caching architectures [13]. Finding optimal placement of Web proxies in a network can yield successive reductions in network traffic, but an expensive cost in replication of disk storage is needed in Web caching architectures. The main purpose of interest at this project is to reduce the cost of replication and Web traffic in Web caching architectures.

Web documents contain text, images, applets and streaming audio/video as well as hypertext links. In general, images have static information and other objects have dynamic contents. Caching of static information provides great performance gains when multiple Web caches do collaborate to serve each other's cache information.

According to the Web document characteristics the top requested Web documents are image files and text files (e.g., gif 42.3% and jpeg 12.3% and html 24.4%). The largest percentage of bytes transferred is accounted for by image files with 40% (e.g., gif 20.9% and jpeg 18.9% and html 25.3%). Streaming media such as audio and video is still a relatively small proportion of total traffic volumes. The remaining content types account for decreasing numbers of transferred bytes with a heavy-tailed distribution [16]. Web tracing studies indicate that the efficient image distribution is the solution to accelerate performance of IP networks.

The most e-Commerce Web sites display many small images such as logos, icons, text as graphics and products' photos in one page. Web servers are handling an increased load of small images with the exponential growth of e-Commerce Web traffic. Maintaining cache consistency for e-Commerce data is expensive. Time-to-live (TTL) fields, active invalidation protocols such as Web cache invalidation protocol (WCIP), and client polling are used to avoid transferring the potential of caching stale data. Validation, invalidation or reload of images not only burdens the user, but also burdens the Web server. Data compression and Web caching are increasingly important in providing fast Internet Services. However, these technologies have been developed separately.

The goal of our project is to improve the image distribution and management technologies using a multi-disciplinary approach.

REFERENCES

[1] G. Barish and K. Obraczke, "World Wide Web Caching: Trends and Techniques," *IEEE Communications Magazine,* Volume: 38, Issue: 5, pp. 178-184, May 2000.

[2] R. C. Burns, R. M. Rees, and D. D. E Long, "Efficient data distribution in a Web server farm," *IEEE Internet Computing,* Volume: 5, Issue: 4, pp.56-65, July-August 2001.

[3] H. Che, Y. Tung, and Z. Wang, "Hierarchical Web Caching Systems: Modeling, Design and Experimental Results," *IEEE Journal on Selected Areas in Communications,* Volume: 20, Issue: 7, pp. 1305-1314, Sep. 2002.

[4] B. D. Davison "A Web Caching Primer," *IEEE Internet Computing,* Volume: 5, Issue: 4, pp. 38-45, July-August 2001.

[5] J. Gray and P. Shenoy "Rules of Thumb in Data Engineering," *IEEE International Conference on Data Engineering,* pp. 3-10, 2000.

[6] G. Huston, "Web Caching," *Internet Protocol Journal,* Volume: 2, Number 3, September 1999.

[7] B. Krishnamurthy, C. E. Wills, "Analyzing factors that influence end-to-end Web performance," *Computer Networks,* Volume: 33, Issue: 1-6, pp. 17-32, June, 2000.

[8] C. Liu and P. Cao, "Maintaining Strong Cache Consistency in the World-Wide Web," *IEEE Transactions on Computers,* Volume: 47, Issue: 4, pp. 445-457, April 1998.

[9] A. Mahanti, C. Williamson, and D. Eager, "Traffic Analysis of a Web Proxy Caching Hierarchy," *IEEE Network,* Volume: 14, Issue: 3, pp. 16-23, May-June 2000.

[10] S. Michel, K. Nguyen, A. Rosenstein, L. Zhang, S. Floyd, and V. Jacobson, "Adaptive web caching: towards a new global caching architecture," *Computer Networks and ISDN Systems,* Volume: 30, Issue: 22-23, pp. 2169-2177, Nov. 25, 1998.

[11] A. L. Montgomery and C. Faloutsos, "Identifying Web browsing trends and patterns," *Computer,* Volume: 34, Issue: 7, pp. 94-95, July 2001.

[12] Ben Chung Pun Ng and Ch Li Wang, "Document distribution algorithm for load balancing on an extensible Web server architecture," Proceedings. *IEEE/ACM International Symposium on Cluster Computing and the Grid,* pp. 140-147 May 15, 2001.

[13] P. Rodbriguez and C. Spanner, and E. W. Biersack, "Analysis of Web caching architectures: hierarchical and distributed caching," *IEEE/ACM Transactions on Networking,* Volume: 9, Issue: 4, pp. 404-418, August 2001.

[14] R. Tewari, M. Dahlin, H. M. Vin, and J. S. Kay, "Beyond hierarchies: Design considerations for distributed caching on the internet," *Technical Report TR98-04,* The University of Texas at Austin, 1998.

[15] D. Wessels and K. Claffy, "ICP and the Squid web cache," *IEEE Journal on Selected Areas in Communications,* Volume: 16, Issue: 3, pp. 345-357, April 1998.

[16] A. Wolman et. al, "Organization-Based Analysis of Web-Object Sharing and Caching," *Proceedings of the*

OBJECTS AND SUMMARY OF THE INVENTION

One object of the present invention is to provide a method for efficient image distribution and management.

A related object of the present invention is to optimize the placement of Web proxies in a network so as to provide successive reductions in network traffic.

Another related object of the present invention is to reduce the cost of replication and associated Web traffic in Web caching architectures.

The present invention employs compact image data structures and packet delivery techniques for Internet applications. Images on a Web page are inefficiently stored, using a single image per file. Invention uses clustering to merge similar images into a single file in order to exploit the redundancy between images. A 30-50% image data size reduction is achieved by eliminating the redundancies of color indexes. A metadata file permits an easy extraction of images. Present invention permits a more efficient use of the cache, since a shorter list of cache references is required. Packet and transmission delays are reduced by 50% eliminating redundant TCP/IP headers and connection time. Present invention eliminates redundancy and provides valuable benefits for optimizing packet delivery in IP networks by reducing latency and minimizing the bandwidth requirements.

Advantages and New Features

There are several advantages and new features of the present invention relative to the prior art. An important advantage is the fact that the present invention provides a method for efficient image distribution and management.

Another advantage is that metadata can be used to easily update compact clustered images.

A further advantage is multiple copies of compact images placed in intermediate network levels in hierarchies are easily replaced with fast connection and transmission times.

Still yet other advantages of the present invention are a reduced number of headers, reduced delivery of acknowledgements (ACKs), reduced routing decisions, reduced protocol processing and device interrupts, and reduced transmission, propagation, storage, forwarding, and queuing delay times.

BRIEF DESCRIPTION OF THE DRAWINGS

FIG. 4 depicts the image data reduction from compacting small images

FIG. 10 depicts the reduction of packets, TCP/IP header size and transmission delay attributable to the present invention

DETAILED DESCRIPTION OF THE PREFERRED EMBODIMENT

The present invention considers Web characteristics in order to improve the performance of Web caching. Compact image data structure for hierarchical and distributed Web caching are utilized by the invention. It has been determined that the best aspect of the compact image data model is that header and packet redundancies are eliminated for efficient data compression and communications. In those cases, network bandwidth and disk bandwidth can be saved. One of the many benefits of the present invention is the reduction of disk access by using a few large transfers rather than many small ones [5]. Hierarchical meta-data information about the contents of the sharing of caches among Web proxies is needed for fast searching.

The compact image data structure with metadata is appropriate to manage huge image database in the complex systems of networks. The successful integration of acting with Internet programmers, compression researchers, network architecture groups, browser developers, proxy cache vendors, network performance engineers, and database developers is needed to develop and deploy our innovative solutions on networks.

Web Caching Architectures

Caching is the most common solution to the Internet traffic congestion on the information superhighway. Caching can either be done at a client's Web browser or a proxy cache. The cache holds the most recently downloaded Web documents in order to revisit a page without having to download it from the origin Web server again. Caching at proxies that are located at the edge of networks has been known as a solution to reduce the traffic through the bottleneck.

Hierarchical and distributed caching architectures are available for configuring Web caches. In both architectures, a group of Web caches can benefit by sharing another cache. The Harvest group initially designed the Internet Cache Protocol (ICP) that is a hierarchical caching protocol that supports discovery and retrieval of documents from neighboring caches. The Squid proxy server implements version 2 of the ICP protocol that is Summary-Cached enhanced ICP [15].

In a hierarchical caching architecture, the proxy servers are being connected to establish peering relationships with its neighbor caches either parent or sibling. The difference between a sibling proxy and a parent proxy is that a sibling proxy cannot fetch a document from the origin Web server, but a parent proxy can do it. The hierarchical approach is appropriate in Wide Area Networks (WAN) because cashes are placed at multiple levels of networks.

In a distributed caching architecture, caches are only placed at the bottom levels of the networks. The Cache Array Routing Protocol (CARP) is a distributed caching protocol that divides URL space among an array of loosely coupled proxy servers and uses hash-based routing to provide a deterministic request resolution path through an array of proxies. An advantage of the CARP approach is that it eliminates duplicate copies of documents.

Figure 1:
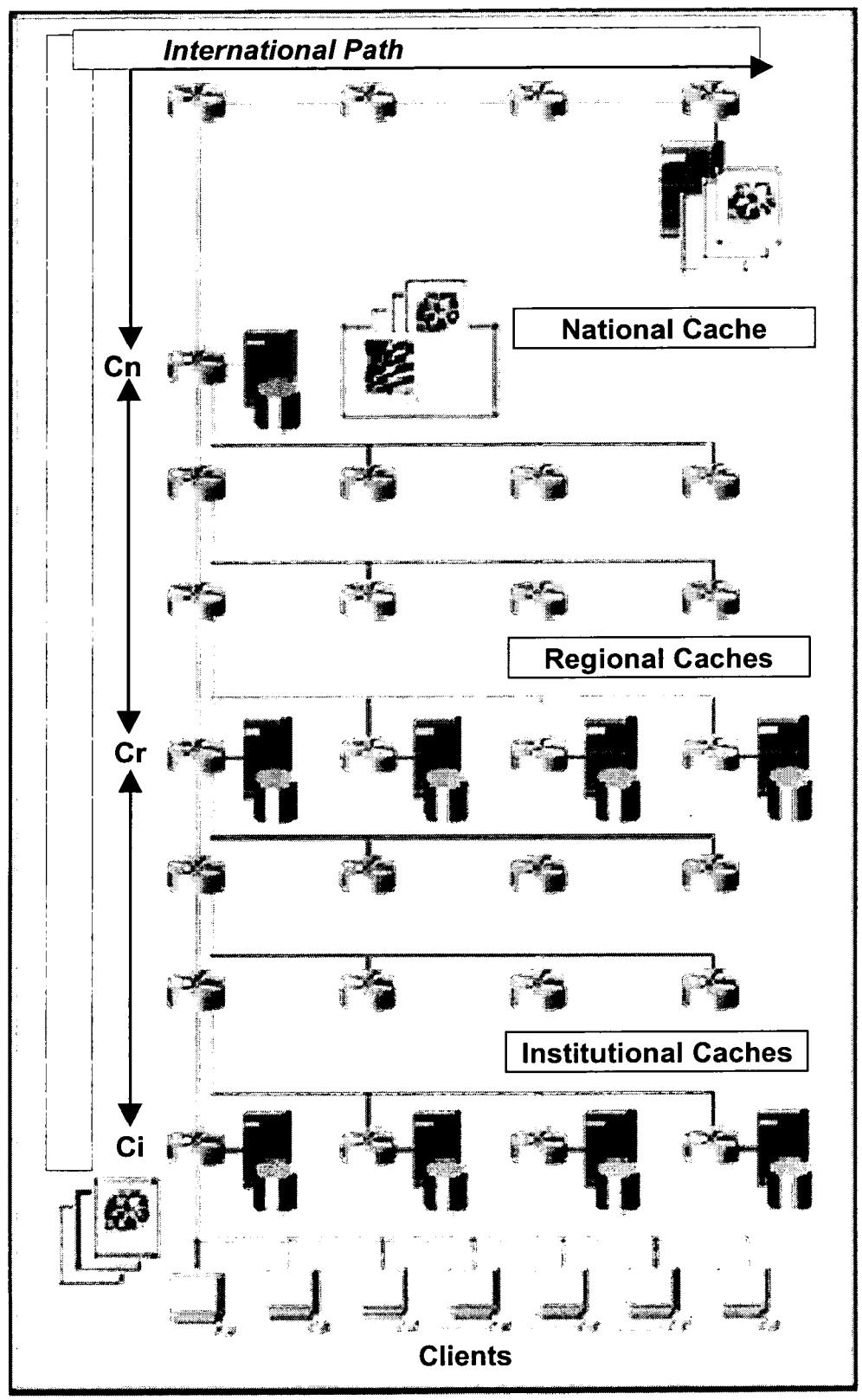
FIG. 1 depicts a prior art hybrid scheme for proxy caching
Figure 2:
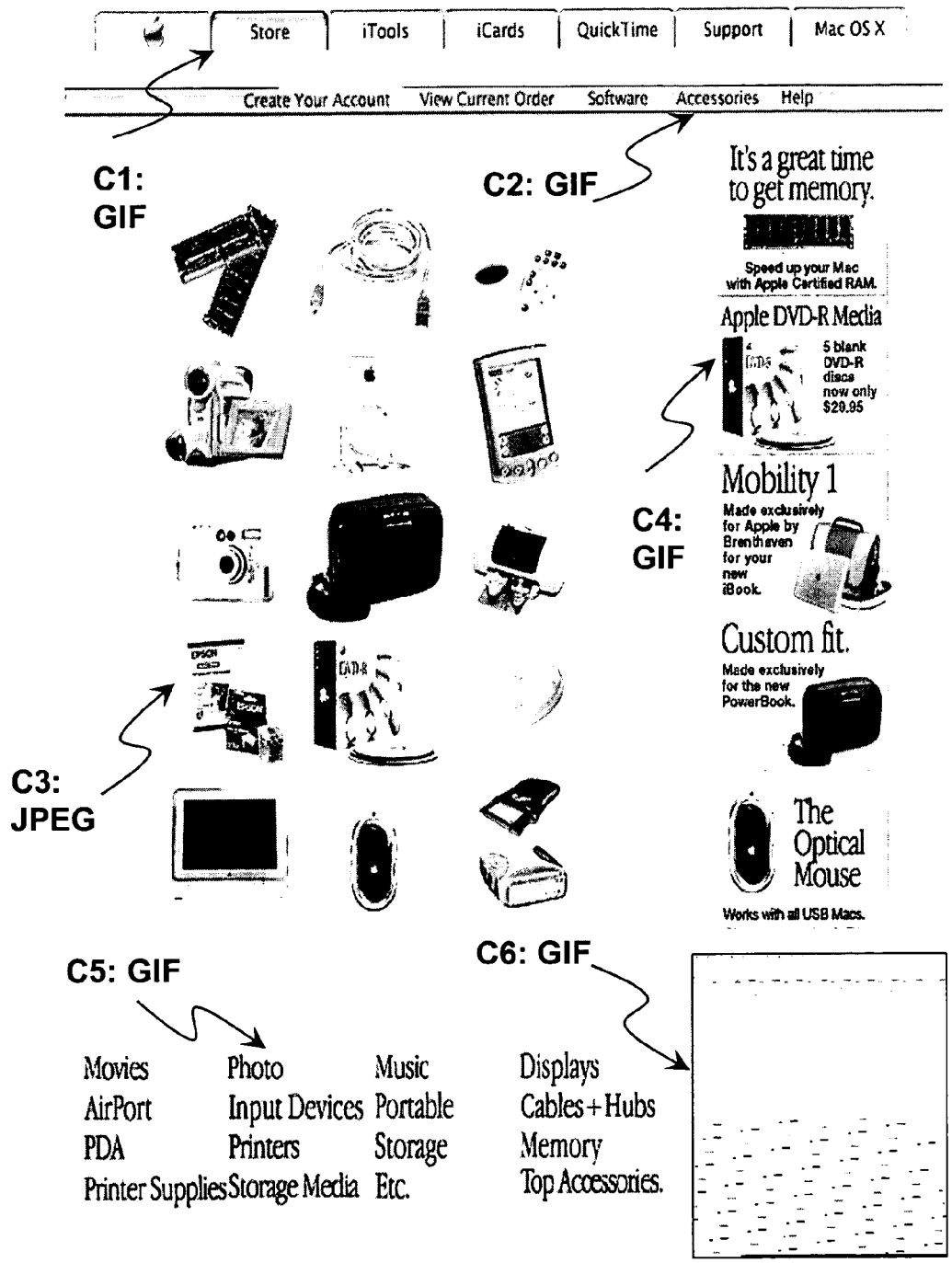
FIG. 2 depicts compact images
Figure 3:
FIG. 3 depicts one compact image as contained in FIG. 2
Figure 5:
FIG. 5 depicts a consistent layout of images of similar color and dimension
Figure 6:
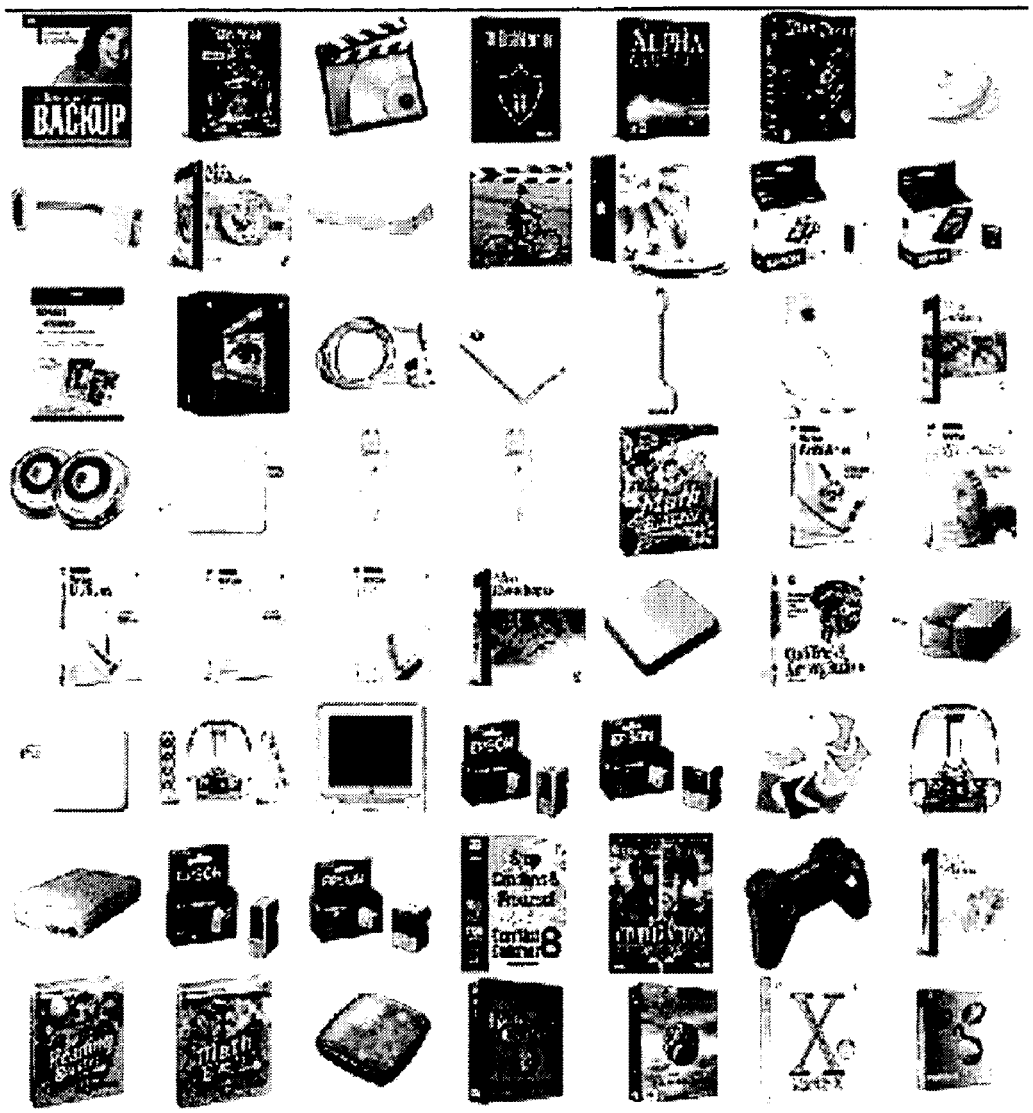
FIG. 6 depicts a consistent layout of images of similar color and dimension

Most Internet Service Providers (ISPs), institutions and countries have established hierarchies of proxy caches that cooperate via ICP to reduce traffic to the Internet. The major problem associated with a caching hierarchy is that higher level caches become bottlenecks and have long queuing delays due to additional delays at every hierarchy level. To reduce the retrieval latency, additional copies of documents are placed in intermediate network level of caches for small documents. Rodbriguez [13] proposed a hybrid scheme (see FIG. 1) where a certain number of caches cooperate at every level of a caching hierarchy using distributed caching to have the advantages of both hierarchical and distributed caching.

Web Image Analysis

GIF and JPEG are both indexed color formats. The GIF file format is very efficient with images that have horizontal regions of solid color and a palette of 256 colors or less. Logos, cartoons, and text as graphics are typical solid-color GIF images. On the other hand, the JPEG file format is useful to compress photographic image that requires more than 256 colors in each color index.

The image characteristic of the most e-Commerce Web sites is that several groups of small images are in their image directories. In the present invention, a mass of small images is classified for fast lookups and delivery in cooperative caching systems. Web graphic designers usually select same dimension and similar color of images for same category to produce a consistent layout as depicted in FIG. 2, FIG. 3, FIG. 5 and FIG. 6. File format for each category of images depends on the color contents of images. In many cases, images within the same category have similar color indices. The redundancies of color indices can be removed by clustering and compression techniques. For example, one HTML file and 61 small image files are needed to display one e-Commerce Web page (see FIG. 1). These small images are clustered with dimensions and file formats. Clusters of images are converted into the 6 compact images C1-C6 of FIG. 2. Similar dimensions of images can be easily obtained by arranging small images in order to obtain compact images C1-C5. Irregular dimensions of images (e.g., dot, vertical and horizontal lines, etc.) are collected and converted into one dimension and then a compact image C6. The mosaic images are compressed with the original image formats. The most significant compressed image in the test images is the compact image C6 (e.g., 1,248 bytes for a compact image and 4,981 bytes for 11 images—75% reduction). FIG. 4 shows that total file size of 61 images are reduced by about 30% for one Web page. The other web page images were also clustered and analyzed. FIG. 4 indicates that about 30%-50% of image data size reduction can be achieved by compacting small images.

Figure 7:
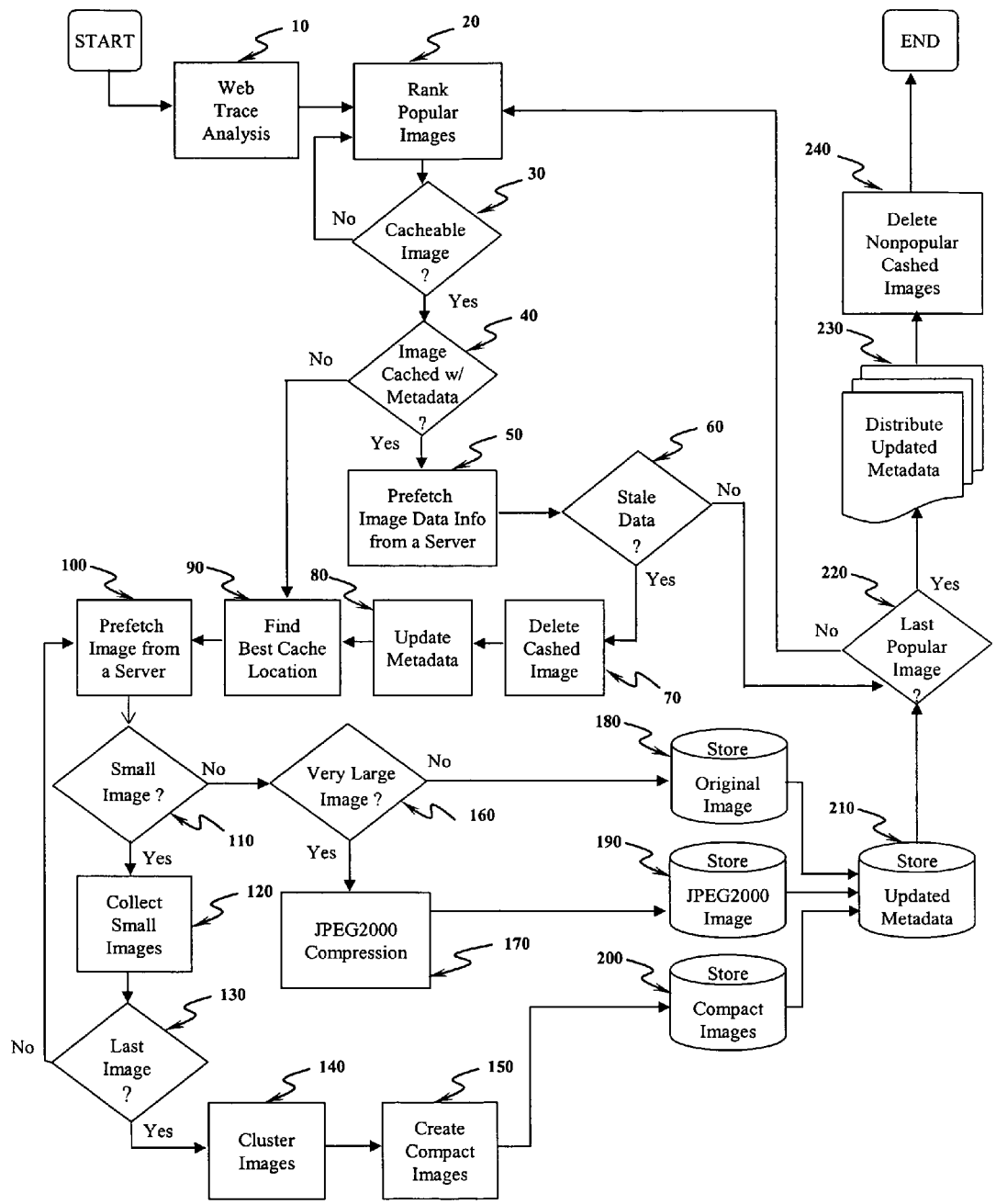
FIG. 7 a process flowchart of the present invention

Referring now to FIG. 7, the process flow of the present invention is depicted. Most proxy caches are deployed by large companies or ISPs that want to reduce the amount of Internet bandwidth. Proxy caches are a type of shared cache and are placed on their firewalls. The present invention efficiently manages Web proxy cache systems by employing the following steps. Images are collected and analyze traces 10 of several different Web servers to rank popular images 20. Images are ranked according to the number of hits, page views and visits. A highly ranked image is called a popular image. Ranked popular images are examined to determine if they are cacheable 30. For example, if images are password protected they should not be cached. If a popular image is determined to not be cacheable the present invention points to the next popular image 20. Cacheable images are checked whether it is in the database with the metadata 40. If an image is cached with metadata, then image data information is prefetched 50 from a server. Prefetching 50 improves download times by proactively retrieving the many embedded image objects on each Web page in order to get image data information such as title, size, created date and modified date from a server. The image is then examined to determine whether it is stale or not 60. If an image is determined to be stale 60, the stale image is deleted 70 and the metadata is updated 80. However, if it is determined that the image is not stale 60, the present invention proceeds to determining whether the last popular image is cached (i.e., stored) in the proxy cache 220. Otherwise, the best cache location 90 is determined from which to prefetch an image and the image is then prefetched from a server 100. Time-to-live field (TTL) is an a priori estimate of an object's life time in order to be used to determine how long cached data remain valid. Frequently, the TTL is set to a relatively short interval to prevent that stale data are rarely returned. Image data may be reloaded unnecessarily with the TTL. Unlike other web caching techniques, the present invention prefetches image data information to know whether an image is stale or not.

If it is determined that the image is small 110, small images are collected 120 and prefetching of images 100 from a server continues until the last small image in a web page image is collected 130. Most e-Commerce web sites display many small images such as logos, icons, and products' photos in one page and it is these images that will be collected and stored in buffer storage. Small images are clustered 140 and a compact image is created 150. The present invention utilizes clustering to merge similar images into a compact image (i.e., a single file) in order to exploit the redundancy between images. Compact images are stored in the proxy cache 200. If it is determined that an image is very large 160, the image is compressed with JPEG2000 software 170 and stored in the JPEG2000 image storage in the proxy cache 190. However, if an image is determined to be neither very small not very large, it is just stored in the proxy cache 180.

Metadata is updated and stored in the proxy cache 210. The procedure is repeated until the last popular image is cached in the proxy cache 220. Hierarchical updated metadata is distributed for each level of caches 230 and will be used for fast cache lookups. Nonpopular cashed images are deleted with the updated metadata 240.

Multiple caches may also be employed where a particular cache in the multiplicity is assigned to receive storage of images that fall within a particular popularity rank range, such as (but not limited to) low popularity rank range, medium popularity rank range and high popularity rank range.

Latency Analysis

TCP/IP is a routable protocol that is composed of two parts such as TCP (Transmission Control Protocol) and IP (Internet Protocol). TCP is one of the main protocols in TCP/IP networks and the EP protocol deals only with packets. TCP is a connection-oriented (host-host) protocol and IP is a datagram protocol. TCP uses a three-way handshake in order to establish a logical connection between two nodes before any data are transferred. TCP ensures reliable delivery of the total amount of bytes with the acknowledgement (ACK) that is used to check whether a packet is received correctly at the other end or not. The total latency to fetch a document is divided into the connection time and transmission time. Mitigating the effects of latency is one of the major aspects to enhance data transmission. For a small image file, the transmission time is very small and the connection time has a higher relevance because of behavior of the TCP slow-start flow control process due to the three-way handshake.

Figure 8:
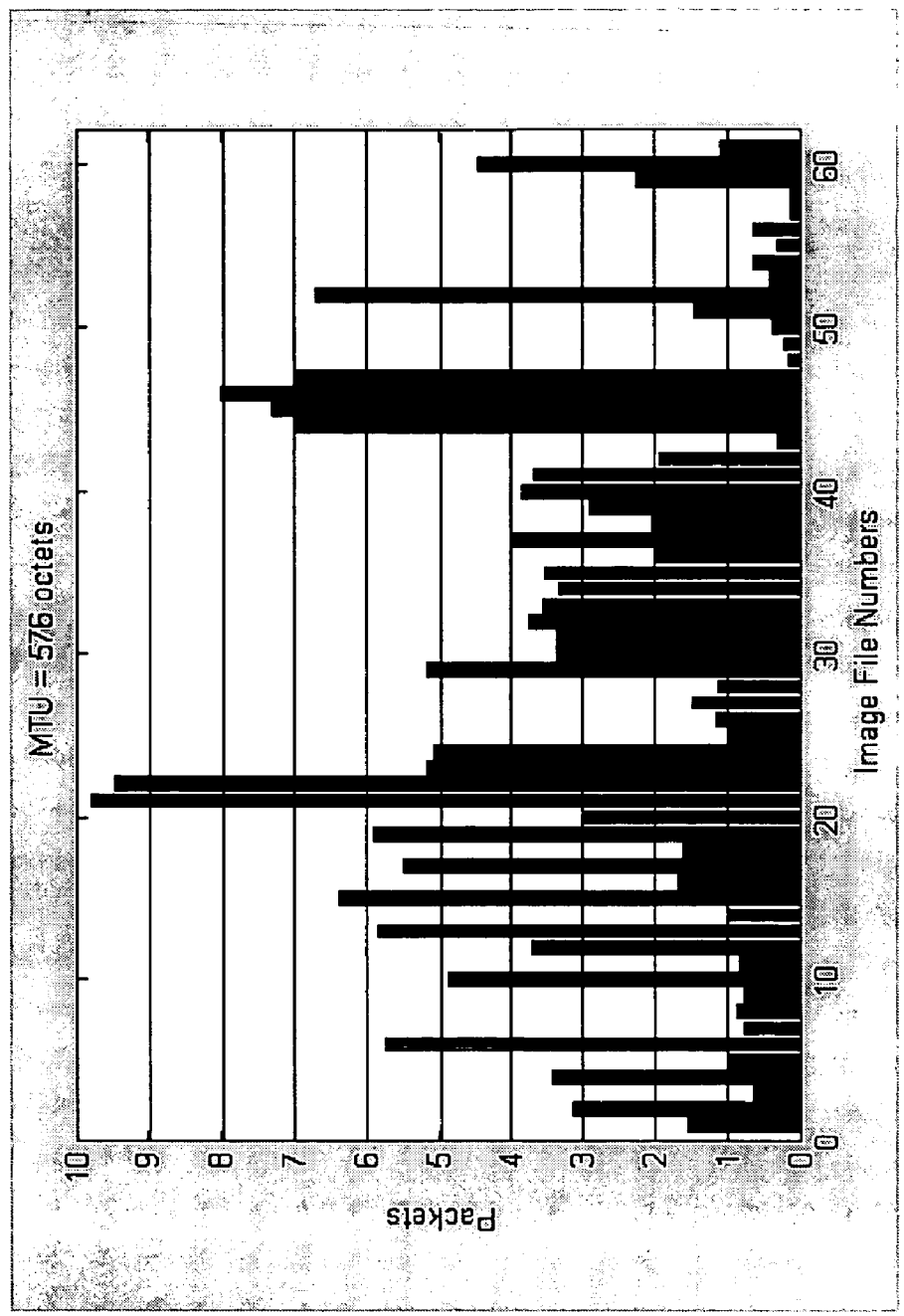
FIG. 8 depicts the redundant TCP/IP headers and connection time due to partially filled packets
Figure 9:
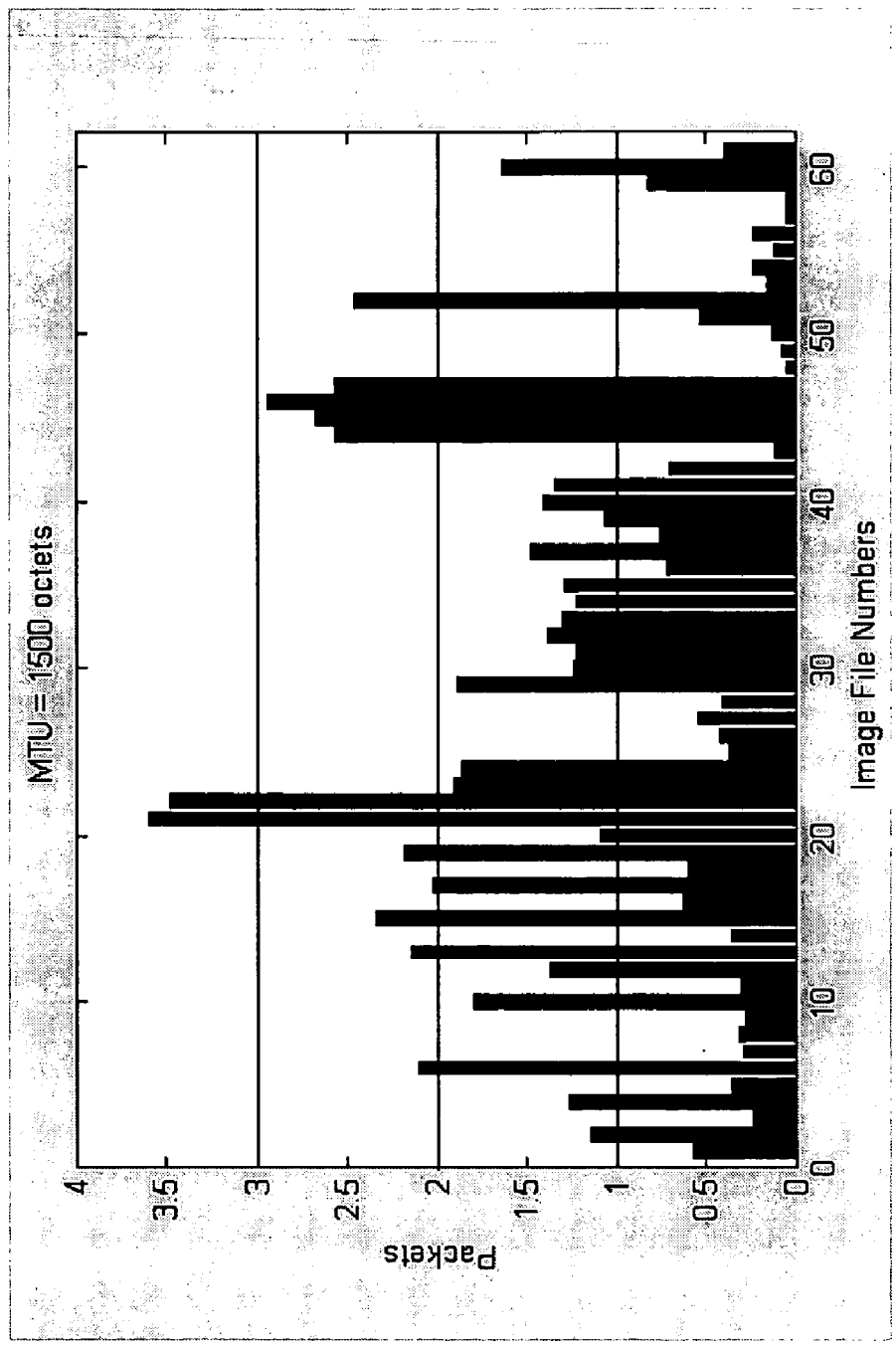
FIG. 9 depicts the redundant TCP/IP headers and connection time due to partially filled packets

Referring to both FIG. 8 and FIG. 9, a maximum transmission unit (MTU) is the largest size packet or frame, specified in octets (eight-bit bytes), that can be sent in a packet or frame-based network such as the Internet. The Internet's Transmission Control Protocol uses the MTU to determine the maximum size of each packet in any transmission. Too large an MTU size may mean retransmissions if the packet encounters a router that can't handle that large a packet. Too small an MTU size means relatively more header overhead and more acknowledgements that have to be sent and handled. Most computer operating systems provide a default MTU value that is suitable for most users. In general, Internet users should follow the advice of their Internet service provider (ISP) about whether to change the default value and what to change it to. The MTU (Maximum Transmission Unit) is the largest physical packet size that can be transmitted on the network.

The MTU of many Point-Point Protocol (PPP) connections is 576 octets (bytes) and the default MTU size for IPv6 packets on an Ethernet is 1500 octets. Ideally, the MTU should be the same as the smallest MTU of all the networks between both ends. Otherwise, packets will be fragmented and transmission speeds will be slowed down. Each transmission unit consists of header and actual data. The largest segment of TCP data that can be transmitted is referred to as MSS (Maximum Segment Size). Essentially, MTU=MSS+TCP header+IP header.

The experimental results are obtained by the following assumptions and formulae:

Assumptions:
1. MSS=MTU-40
2. packets are not being fragmented
3. no packet loss
4. no router congestion Formulae:
(1) The number of packets for a data is calculated by $$\frac{\text{Data size (bytes)}}{MSS \text{ (bytes/packet)}} = N \text{ (packets)}$$

(2) Transmission delay per hop for a packet is given by $$\frac{MTU \text{ (bytes/packet)} * 8 \text{ (bits/byte)}}{\text{bandwidth (bits/s)}} = \lambda \text{ (s/packet)}$$

(3) Transmission delay per hop for a data is given by $$\frac{[\text{Data size (bytes)}][MTU \text{ (bytes/packet)} * 8 \text{ (bits/byte)}]}{[MSS \text{ (bytes/packet)}][\text{bandwidth (bits/sec)}]} = N\lambda = \Lambda \text{ (s)}$$

EXAMPLE 1

Calculate packets and transmission delay times to transfer 1 MB (1,048,576 bytes) data in TCP/IP networks for different packet size (MTU=1500 bytes and 576 bytes) over a T1 line using the above formula:

The number of packets to transfer 1 MB data:
  MTU=1500 bytes, $N_1$=1,048,576/1460=718.2=719 (packets).
  MTU=576 bytes, $N_2$=1,048,576/536=1956.3=1,957 (packets).

Transmission delay times per hop for a packet:
  MTU=1500 bytes, $\lambda_1$=(1460+40)*8/1,544,000=7.772 ms/packet delay per hop
  MTU=576 bytes, $\lambda_2$=(536+40)*8/1,544,000=2.924 ms/packet delay per hop.
  where T1 bandwidth=1,544,000 bits/s, TCP header=20 bytes, and IP header=20 bytes.
  Transmission delay times per hop for 1 MB data:
  MTU=1500 bytes, $\Lambda_1 = N_1\lambda_1$=(719)(7.772)=5,588 (ms)=5.588 (s)
  MTU=576 bytes, $\Lambda_2 = N_2\lambda_2$=(1,957)(2.924)=5,722 (ms)=5.722 (s)

TCP/IP Packet Header size for 1 MB data:
  MTU=1500 bytes, $H_1=N_1$(40bytes)=(719)(40)=28,760 (bytes)
  MTU=576 bytes, $H_2=N_2$(40bytes)=(1,957)(40)=78,280 (bytes)
  $H_2-H_1$=78,280-28,760=49,520 (bytes)

In larger packets the overhead is smaller. Additional 49,520 bytes of headers are needed to transfer each MByte. For 10-hop transfer, the additional overhead accounts for 1.34 seconds difference in transfer time for every MByte. Many partially filled packets produce redundant TCP/IP headers and connection time. The total latency to fetch small images in one Web page can be decreased by removing redundant connections and TCP/IP headers.

Image Distribution and Management

Referring to FIG. 10, measurements of ISP traffic profiles indicate that image type is the major contributor to the hit rate. Therefore, the efficient image data distribution and management are essential for improving the performance of caching systems. Page hit rates of between 40% to 55% and the associated byte hit rates of between 20% and 35% can be achievable for a well configured cache. The hit rates will be improved by increasing the disk space of the cache. However, the large cache capacity yields the negative cache effectiveness. Large caches take some weeks to build up a sufficiently large repository of cached data to produce an improved cache hit rate. Generally, 10 to 100-gigabyte cache systems provide extremely effective cache performance. Memory demands in a large cache also need to be carefully configured. The URL index of the storage system is stored in memory for fast cache lookups. In most cache architectures, the more disk storage is configured and the larger the memory is required [6].

The present invention therefore improves the performance of caching systems without increasing memory and cache capacities. In the present invention, a mass of small Web images in caches are clustered and compressed to enhance Web caching. The hierarchical metadata is used to describe the contents of compact images and shared in Web caching architectures. The compact image based metadata contains compact image information such as the image file format and dimension, the name of the author, the rating, the copyright, the URL navigation, the expired date, and the caching date are clustered to build the hierarchical metadata. It is preferred that compact images are transmitted and updated in hierarchical and distributed systems and are decompressed at client's browser. The compact images can be retrieved by using the content size of each image and file format that are listed in the metadata. In the present invention hierarchical metadata for each level of caches is used with compact images for fast cache lookups.

What is claimed is:

1. A method for efficient image distribution and management comprising the steps of:

collecting images and analyzing web server traces;
ranking popular images;
determining whether said image is cacheable;
  IF it is determined that said image is not cacheable, THEN,
    returning to said step of ranking popular images and selecting next said popular image;
  OTHERWISE, determining whether said cached image is contained in the database with metadata;
    IF said cached image is contained in the database with metadata, THEN, prefetching image data information from a server;
      determining whether data is stale;
        IF image data is stale, THEN, -continued

```
        deleting cached image;
        updating metadata;
      OTHERWISE, proceeding to step of determining whether last
      popular image has been cached;
    OTHERWISE, finding best cache location;
      prefetching an image from a server;
        determining whether said image is a small image;
        IF said image is a small image, THEN,
          collecting small images;
            determining whether last said image is collected;
            IF last said image is collected, THEN,
              clustering said images;
              creating compact images;
              storing said compact images in proxy cache;
              storing updated metadata;
                determining whether last popular image has
                been cached;
                  IF last popular image has been cached,
                    THEN, distributing said updated metadata;
                    deleting non-popular cached images;
                  OTHERWISE, returning to said step of
                    requesting cachable ranked images;
              OTHERWISE, returning to said step of prefetch-
                ing an image from a server;
        OTHERWISE, determining whether said image is very large;
            IF said image is very large, THEN;
              performing image compression on said very
                large image,
              storing said compressed image in proxy
                cache; returning to said step of storing
              updated metadata; OTHERWISE, storing original
                image in proxy cache; and
              returning to said step of storing updated
                metadata.
```

2. Method of claim 1, wherein said step of performing image compression further comprises performing JPEG 2000 compression.

3. Method of claim 1, wherein said metadata is hierarchical.

4. Method of claim 1, wherein said step of storing updated metadata further comprises the steps of updating image file format, image file dimension, name of image author, image rating, image copyright, URL navigation, expiration date and caching date.

5. Method of claim 1, wherein said step of ranking popular images further comprises ranking images according to criteria selected from the group consisting of the frequency of: hits, page views and visits.

6. Method of claim 1, wherein said step of prefetching further comprises retrieving image title.

7. Method of claim 1, wherein said step of prefetching further comprises retrieving image size.

8. Method of claim 1, wherein said step of prefetching further comprises retrieving image creation date.

9. Method of claim 1, wherein said step of prefetching further comprises retrieving image modification date.

10. Method of claim 1, wherein said step of storing images further comprises storing said images in a plurality of caches, wherein each cache of said plurality of caches corresponds to a ranking range of said popularity rank of said image being stored.

\* \* \* \* \*